United States Patent
Forsen et al.

(10) Patent No.: US 6,386,141 B1
(45) Date of Patent: May 14, 2002

(54) APPARATUS FOR MILKING OR OTHER ANIMAL OPERATION HAVING ROBOT ARM SUSPENSION CAPABLE OF PERFORMING A PENDULUM MOVEMENT

(75) Inventors: Gosta Forsen, Tullinge; Birk Uzi, Huddinge, both of (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/554,466

(22) PCT Filed: Nov. 13, 1998

(86) PCT No.: PCT/SE98/02054

§ 371 Date: May 23, 2000

§ 102(e) Date: May 23, 2000

(87) PCT Pub. No.: WO99/25177

PCT Pub. Date: May 27, 1999

(30) Foreign Application Priority Data

Nov. 14, 1997 (SE) ................................. 9704173
Nov. 14, 1997 (SE) ................................. 9704176

(51) Int. Cl.[7] ................. A01J 5/00; A01J 7/00
(52) U.S. Cl. .................... 119/14.08; 119/14.1
(58) Field of Search .............. 119/14.01, 14.18, 119/608, 609, 664, 14.1; 15/23, 21.1

(56) References Cited

U.S. PATENT DOCUMENTS

| | | | | |
|---|---|---|---|---|
| 5,379,721 A | * | 1/1995 | Dessing et al. .......... | 119/14.08 |
| 5,678,506 A | * | 10/1997 | van der Berg et al. ... | 119/14.18 |
| 5,918,566 A | * | 7/1999 | van den Berg .......... | 119/14.02 |
| 5,967,081 A | * | 10/1999 | Street et al. ............. | 119/14.08 |
| 6,009,833 A | * | 1/2000 | van der Lely ........... | 119/14.02 |
| 6,213,051 B1 | * | 4/2001 | Fransen .................... | 119/14.08 |

FOREIGN PATENT DOCUMENTS

| | | | | |
|---|---|---|---|---|
| CH | 1484333 | | 6/1989 | ............ A01J/5/017 |
| EP | 0091892 | | 10/1983 | ............ A01K/1/12 |
| EP | 0 270 165 A1 | * | 6/1988 | ............ A01K/1/12 |
| EP | 0 360 354 A1 | * | 3/1990 | ............ A01J/7/00 |
| EP | 0 592 043 A1 | * | 4/1994 | ............ A01J/7/00 |
| EP | 0630558 | | 12/1994 | ............ A01J/7/00 |
| EP | 0 630 564 A2 | * | 12/1994 | ............ A01J/7/00 |
| EP | 0635203 | | 1/1995 | ............ A01J/7/00 |
| EP | 0638231 | | 2/1995 | ............ A01J/7/00 |
| WO | WO 9007268 | | 7/1990 | ............ A01J/7/00 |
| WO | WO 9801022 | | 1/1998 | ............ A01J/5/017 |

* cited by examiner

Primary Examiner—Charles T. Jordan
Assistant Examiner—Kimberly S. Smith
(74) Attorney, Agent, or Firm—Weingarten, Schurgin, Gagnebin & Lebovici LLP (57) ABSTRACT

An apparatus for milking or other animal-related operation includes a support means and a robot arm connected to a robot arm suspension means. The robot arm suspension means is hingedly connected to the support means about a horizontal axis, and the robot arm is arranged lower than the support means for allowing the robot arm suspension means to perform a substantially pendulum movement about the horizontal axis.

23 Claims, 10 Drawing Sheets

APPARATUS FOR MILKING OR OTHER ANIMAL OPERATION HAVING ROBOT ARM SUSPENSION CAPABLE OF PERFORMING A PENDULUM MOVEMENT

TECHNICAL FIELD OF THE INVENTION

The present invention relates to an apparatus for performing an animal related operation, comprising a support means and a robot arm connected to a robot arm suspension means.

BACKGROUND OF THE INVENTION

Such an apparatus is known from EP-A-0 519 544.

A disadvantage with the known apparatus is that there is a risk for malfunction of the robot due to the design of the suspension, as an animal stall is a dirty environment.

It is, accordingly, an object of the present invention to minimize the risk for malfunction of the known apparatus.

SUMMARY OF THE INVENTION

This has been solved by an apparatus of the initially defined kind, which is characterised in that said robot arm suspension means is hingedly connected to said support means about a horizontal axis, said robot arm being arranged lower than said support means, for allowing said robot arm suspension means to perform a substantially pendulum movement about said horizontal axis.

By the apparatus according to the invention, the animal is easily accessible at the side where the milking robot is suspended.

Preferably, said robot arm is elongated and extends substantially horizontally and furthermore substantially across said horizontal axis, so that the arm has good access to the teats.

Suitably, a first driving means is connected between said support means and said robot arm suspension means for actively performing said pendulum movement. Hereby is achieved a controllable pendulum movement.

Preferably, said robot arm is pivotally connected to said robot arm suspension means, for allowing said robot arm to perform a pivotal movement in relation to said robot arm suspension means. Hereby is achieved a movement of the robot arm in addition to said pendulum movement.

Suitably, a second driving means is connected between said support means and said robot arm, for actively moving said robot arm in a substantially upward/downward direction; and wherein a third driving means is connected between said robot arm and said robot arm suspension means for actively moving said robot arm in a substantially sideward direction. Hereby is achieved a controllable pivotal movement.

Preferably, said robot arm suspension means comprises a pivot means having a bar movable about a substantially horizontal axis, said bar being provided with a first connection member for said robot arm and a second connection member for said third driving means, each of said first and second connection members being provided with a hinge movable about a substantially vertical axis. Hereby a joint for said pivotal movement is achieved.

Suitably, said robot arm support means comprises an elongated frame of bars. Alternatively, said robot arm support means comprises an elongated tubular member. Hereby, a suspension of a simple design is achieved.

Preferably, said robot arm comprises a manipulating means, for performing said operation.

Suitably, said robot arm is movable into an animal space, at least one side of which being provided with a railing, so that the suspension is protected from less gentle movements of animals.

Preferably, at least two animal spaces are provided, said support means being movable therebetween. Hereby, it is possible to utilise one robot for both animal spaces.

Suitably, the connection between the robot arm suspension means and the support means is arranged at a level substantially above said animal. Hereby, the risk is less for dirt, such as manure, to hamper the movement of mechanical parts. Furthermore, a free surface—such as a floor—is easier to clean than a surface having disturbing mountings, bars etc.

Preferably, said robot arm suspension means is adapted to be transported along a substantially horizontal path between said plurality of animal stalls for allowing said robot arm further to perform at least one animal related operation in a plurality of animal stalls, wherein said robot arm being adapted to be rotated about a substantially vertical axis in relation to said robot arm suspension means, said robot arm further being movable at least into a pair of animal stalls arranged after one another, as seen in a longitudinal direction of said animal stall. Hereby, it is possible to serve two rows of opposite animal stalls with a robot, which is suspended on a single support means.

Suitably, two opposite animal stalls are arranged at a distance from one another, said distance forming a space between said animal stalls, said robot suspension means being arranged substantially in said space. Hereby, a space where the suspension means is movable is created.

Preferably, at least two of said adjacent animal stalls are arranged at an angle to one another. Hereby, also stalls arranged not only after one another, but also angularly, are possible to be served by the robot.

Suitably, an animal stall arranged substantially perpendicularly to the two opposite animal stalls is arranged overlapping thereto, said support means being arranged off-set to the perpendicularly arranged animal stall. Hereby, it is possible to easily find the teats of a lactating animal as the teats are not arranged centrally, but at its rear end.

Preferably, said support means comprises an elongated guide means arranged substantially above said robot arm suspension means, said elongated guide means being arranged along the sides of two animal stalls arranged after one another. Hereby, a rigid support means for the suspension means is provided, which allows the robot to move along the row of animal stalls without touching the floor.

Suitably, said robot arm suspension means comprises a support suspension means connectible to said support means, for allowing said robot arm suspension means to be moved along said bar means.

Preferably, said support suspension means comprises a driving means for performing the movement along said guide means. Hereby, the robot is allowed to actively move between the animal stalls.

Suitably, said robot arm suspension means comprises a driving means for actively performing said rotation.

Preferably, said robot arm is movable in relation to said robot arm suspension means by means of at least one pneumatic cylinder. Hereby, the robot arm is independently movable in relation to the suspension means.

DRAWING SUMMARY

The invention will now be described more closely with reference to the accompanying drawings, in which.

DETAILED DESCRIPTION OF THE INVENTION

Figure 1:
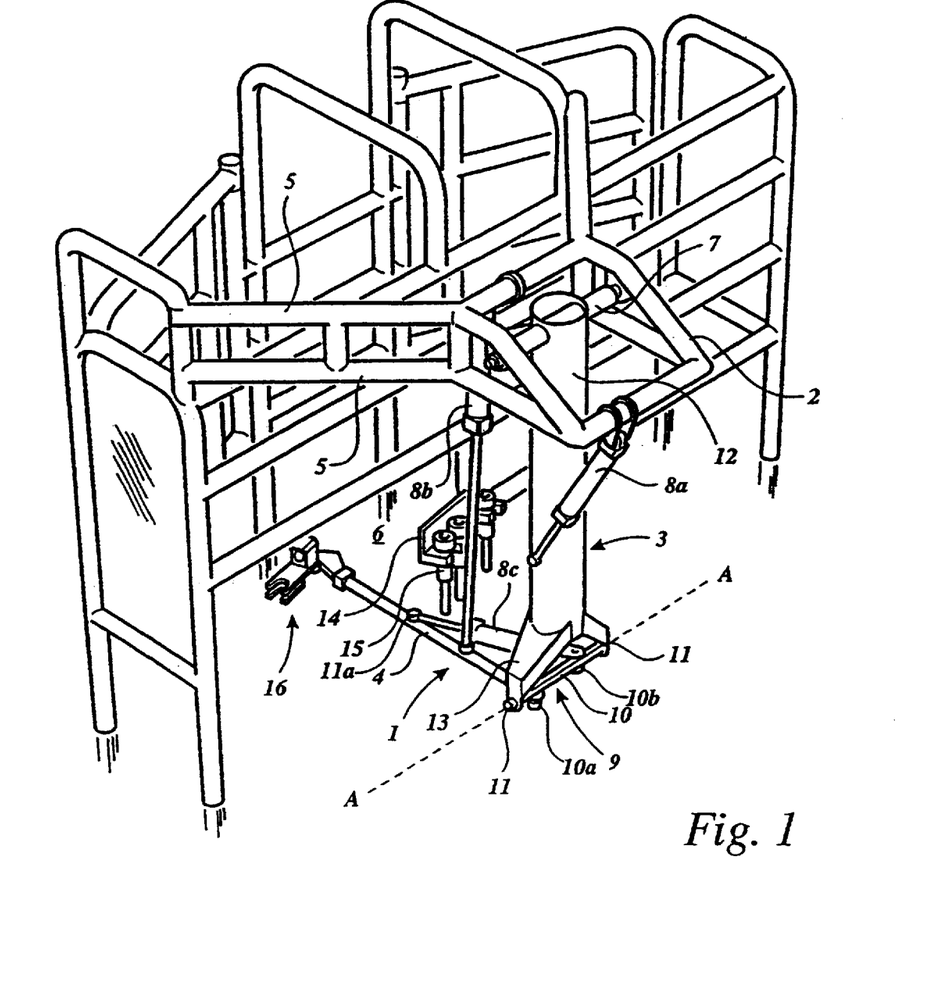
FIG. 1 is a perspective view of the apparatus according to a first embodiment of the invention, the apparatus serving an animal stall.

FIG. 1 shows an apparatus 1 according to the invention, provided with a support means 2, suspension means 3, and a robot arm 4. The support means 2 is connected to a railing 5 of an animal stall 6. The suspension means 3 is connected to the support means by a hinge means 7 having two hinge members, and furthermore by means of a first driving means 8a in the form of a pneumatic cylinder. The robot arm 4 is connected to the support means 2 by means of a second driving means 8b, in the form of a pneumatic cylinder.

Furthermore, the robot arm 4 is connected to a pivot means 9 including a tubular member 10, via a first connection member 10a in the form of a hinge with a substantially vertical axis, about which the robot arm 4 is movable. The tubular member 10 is in turn connected to a pair of hinge members 11, in such a way that the tubular member 10 forms a substantially horizontal axis A—A, about which it is movable.

A third driving means 8c (a pneumatic cylinder) is connected to the tubular member 10 of the pivot means 9 via a second connection member 10b in the form of a hinge with a substantially vertical axis, about which the pneumatic cylinder 8c is movable.

The opposite end of the third driving means 8c is connected to the robot arm via a substantially vertical hinge member 11a, such that when the cylinder operates, the robot arm 4 is moved in a substantially horizontal plane.

The first, second and third driving means 8a, 8b, 8c are associated with a control means (not shown).

The suspension means 3 comprises a tabular body 12 and a pair of arms 13, between which said tubular member 10 is arranged.

A teatcup rack 14 provided with a plurality of teatcups 15 is arranged near or inside the stall 6, so that the robot arm 4 can easily reach and grip a teatcup 15 by means of a manipulating means 16 (see FIG. 3 for further details) arranged on said robot arm 4, and move the teatcup 15 towards a teat of an animal (not shown) in said stall 6 and attach it onto said teat. Each teatcup 15 is connected to a vacuum source (not shown).

Figure 2:
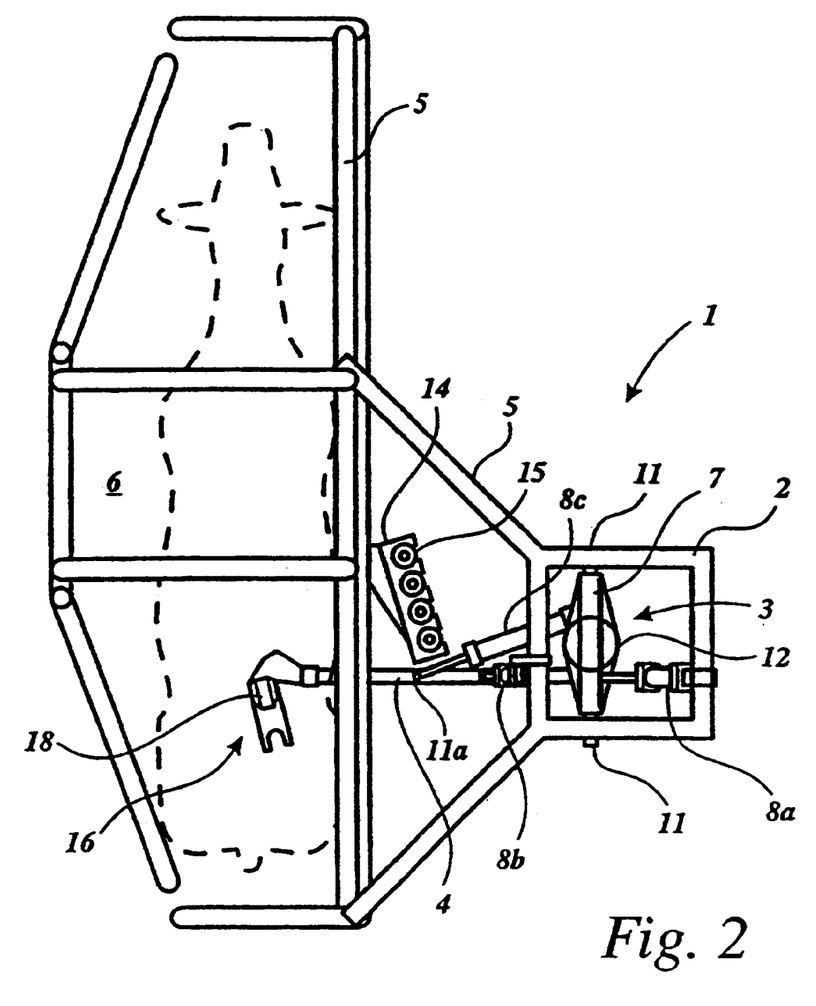
FIG. 2 is a top view of the apparatus shown in FIG. 1.

FIG. 2 shows from above the stall 6 of FIG. 1. A cow is illustrated with broken lines.

Figure 3:
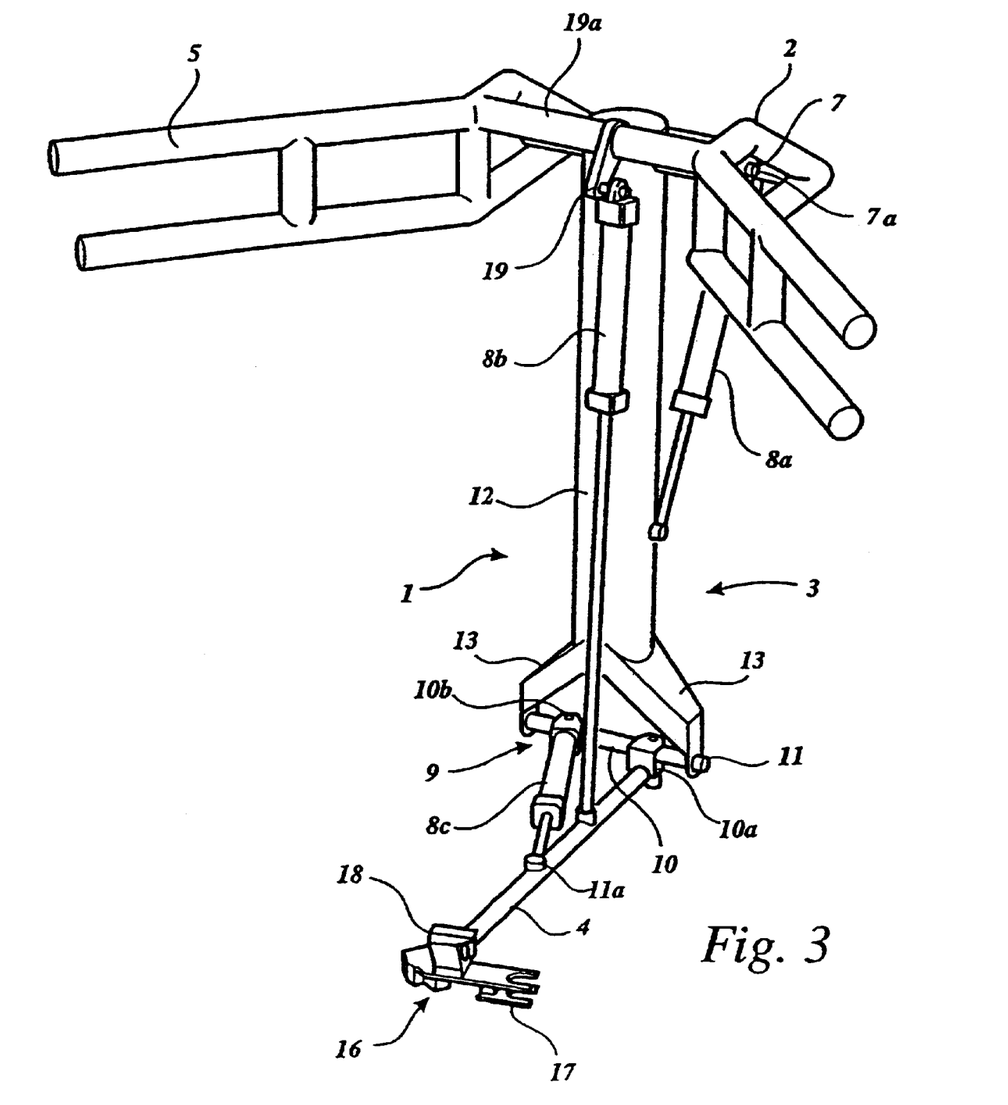
FIG. 3 illustrates parts of the apparatus shown in FIG. 1.

FIG. 3 shows the apparatus according to the invention as seen from the interior of the stall 6, some railings 5 and the teatcup rack 14 being omitted for clarity reasons.

The teatcup manipulating means 16 comprises a gripping member 17 and a teat locating means 18 of the kind disclosed in more detail in SE 9701547-3. The teat locating means 18 is connected to a control means (not shown).

The second driving means 8b is connected to the support means 2 at a connection member 19 of a beam 19a.

At the hinges 11 and 7, there are provided rotary position indicators 11a and 7a, respectively, connected to a control means (not shown) for allowing determination of the position of the robot arm 4 in relation to the suspension means 3, and the position of the suspension means 3 in relation to the support means 2, respectively.

Of course, linear position indication indicators inside or outside the cylinders may be used as an alternative to or in combination with at least one of the described rotary position indicators 7a and 11a.

Figure 4:
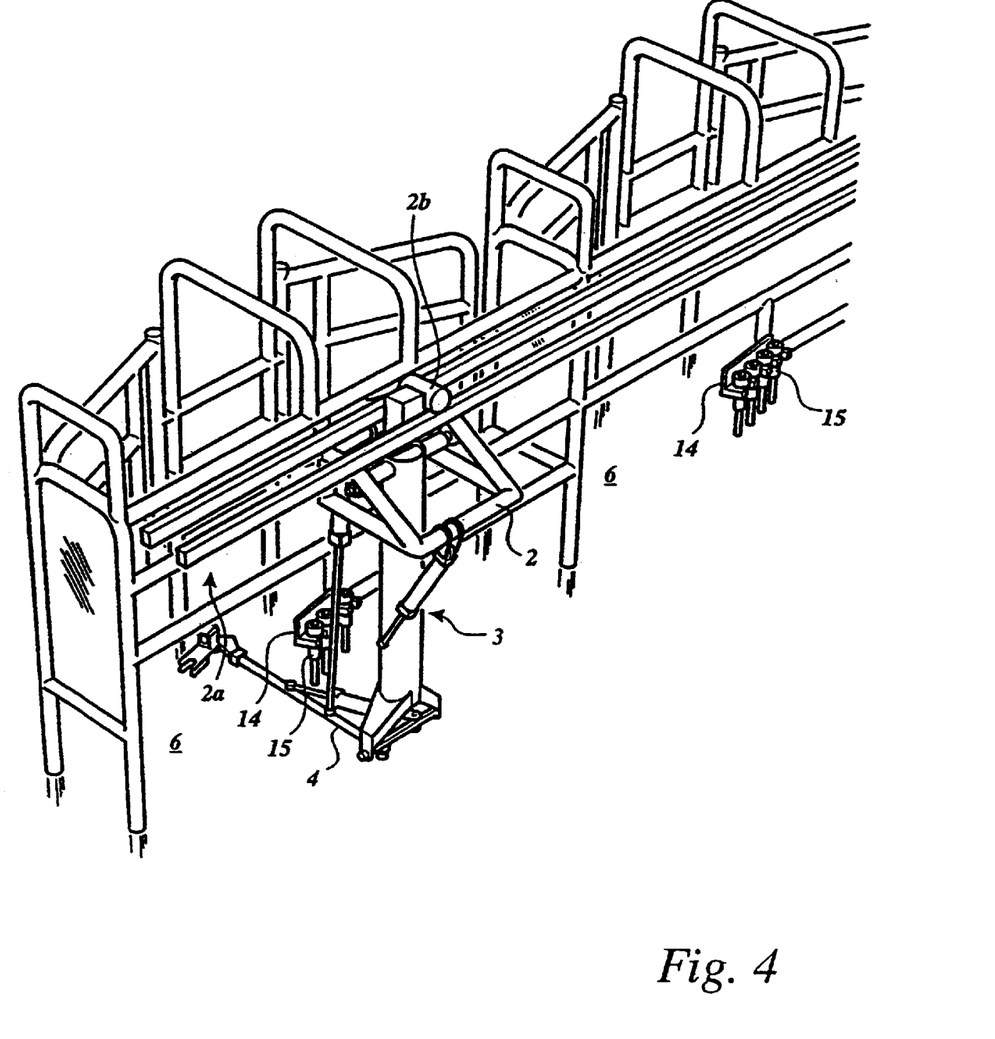
FIG. 4 illustrates the apparatus shown in FIG. 1, serving two animal stalls.

In FIG. 4, the support means 2, including said suspension means 3 and said robot arm 4, is connected to a guide means 2a comprising a pair of horizontal guide members, arranged at a level substantially above the stall, i.e. above the animal to reside in the stall. Of course, it may be arranged at a lower level, but the risk is then bigger for manure to affect the function of movable mechanical parts. A motor 2b, associated with the support means 2, is controlled by a control means (not shown) to move the support means 2 along the guide means 2a between a pair of stalls 6. The second stall is provided with a further teatcup rack 14 with teatcups 15, to be attached to the teats of a cow in that stall, but by means of the same robot arm 4.

Figure 5:
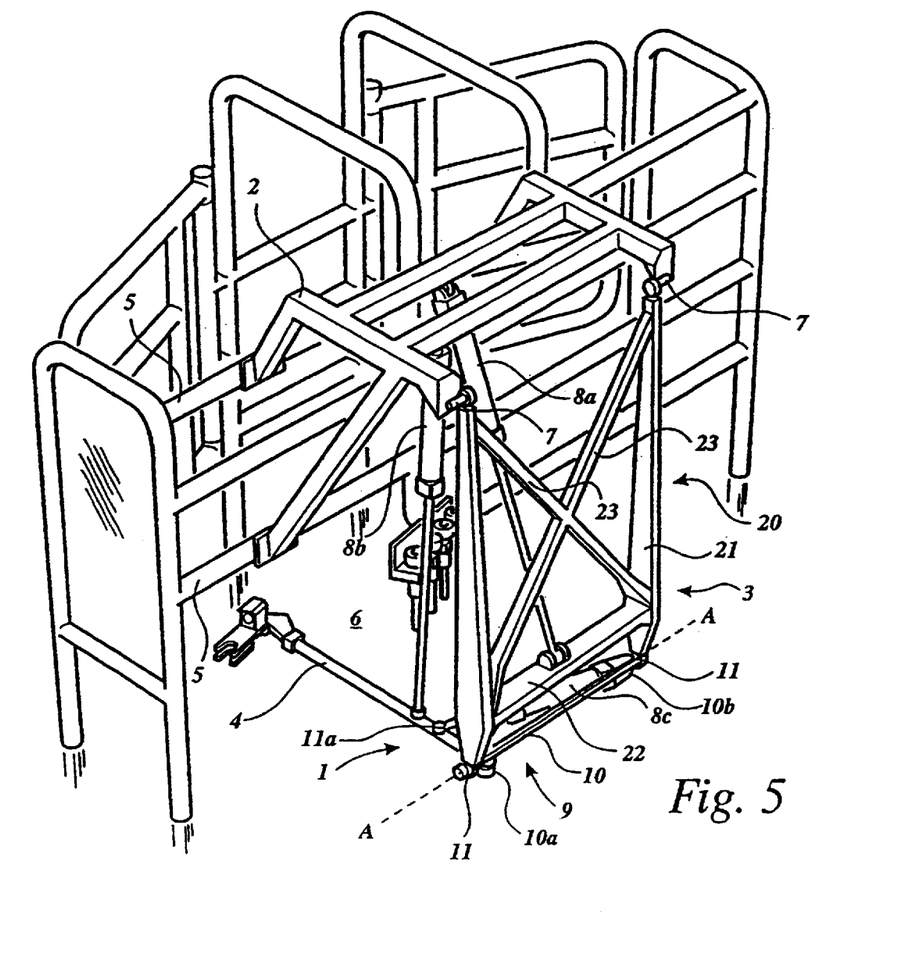
FIG. 5 is a perspective view of a second embodiment of the invention

FIG. 5 shows a second embodiment of the invention, in which parts denoted with a reference sign correspond to parts of the first embodiment with the same reference sign.

The apparatus according to the second embodiment thus includes an alternative suspension means 3, comprising a frame 20 having a pair of substantially vertical members 21, interconnected by a substantially horizontal bar 22 and reinforcing cross members 23, the top end of each vertical member 21 being hingedly joined to the support means 2 at 7.

Figure 6:
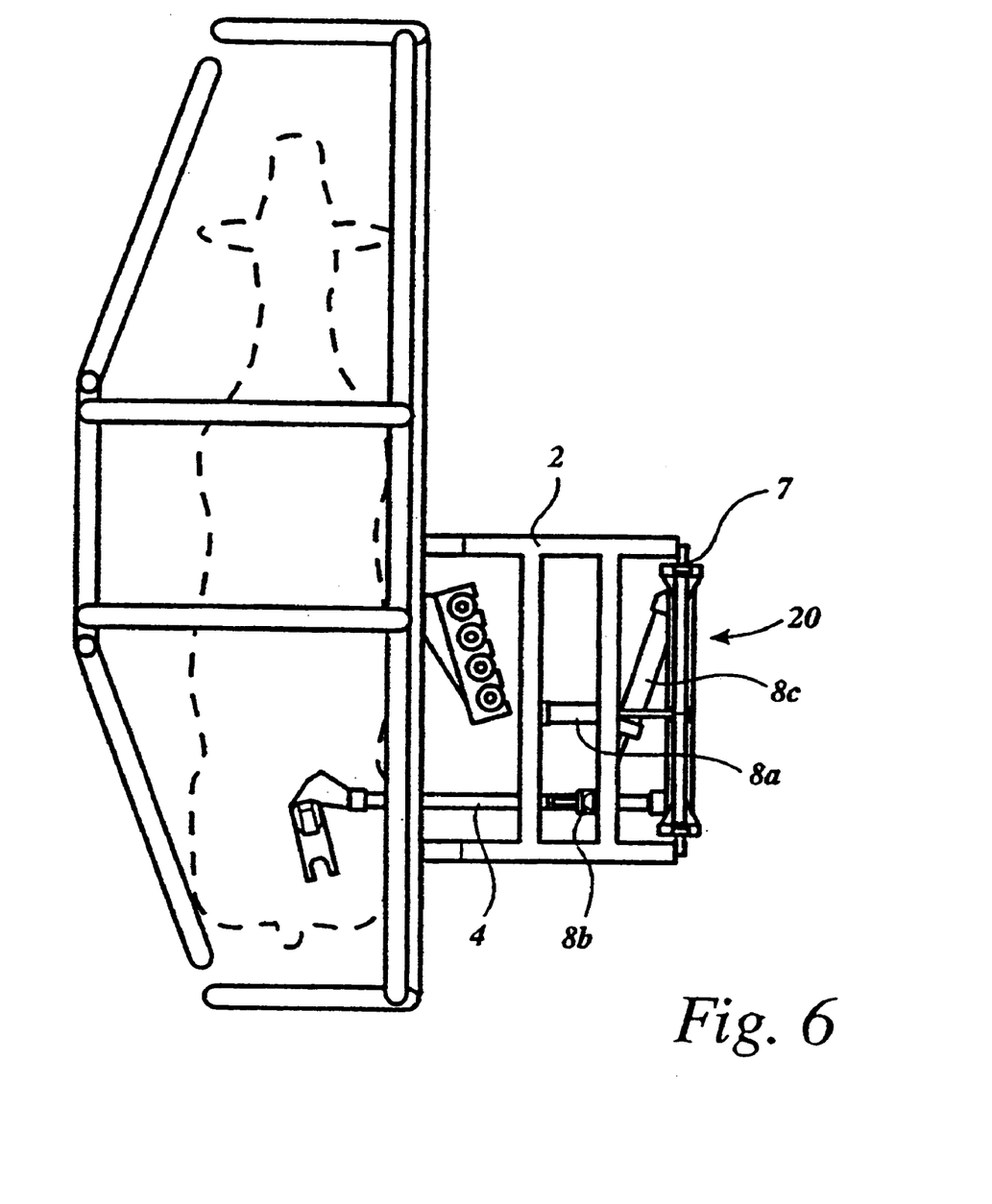
FIG. 6 is a top view of the apparatus shown in FIG. 3.

FIG. 6 shows the stall 6 of FIG. 1 from above.

Figure 7:
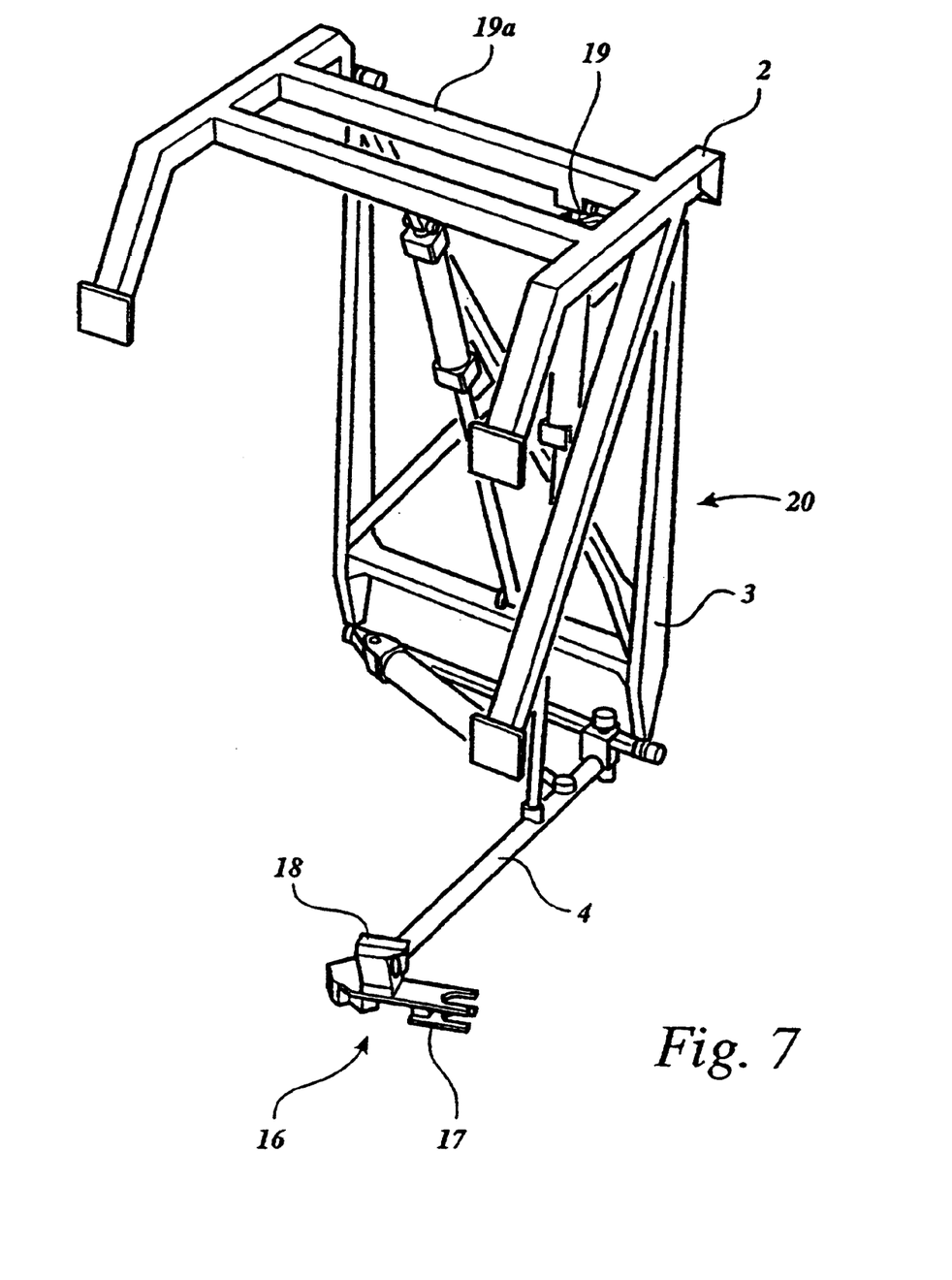
FIG. 7 illustrates parts of the apparatus shown in FIG. 1.

FIG. 7 shows from a different view angle the support means 2, the robot arm 4 and the suspension means 3 in the form a frame 20.

Figure 8:
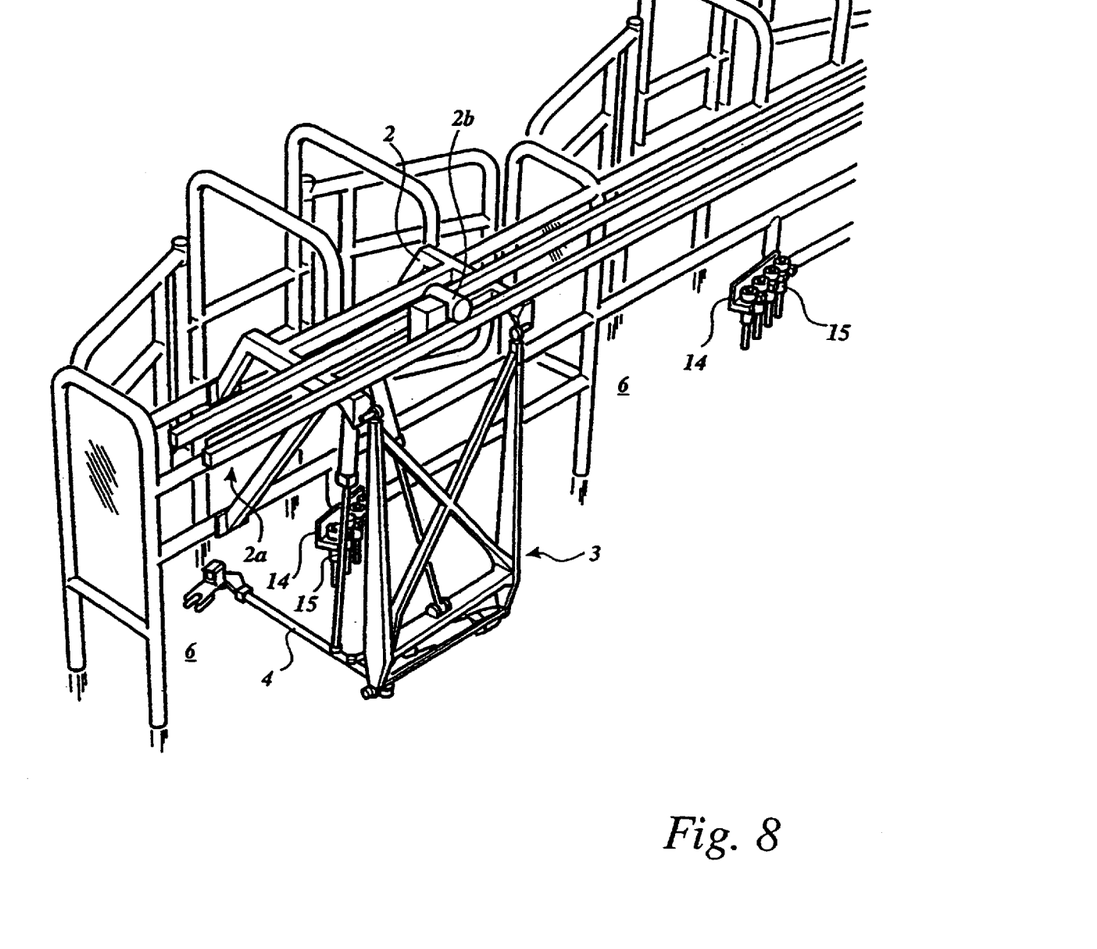
FIG. 8 illustrates the apparatus shown in FIG. 5, serving two animal stalls.

As shown in FIG. 8, the support means 2, the suspension means 3 and the robot arm 4 are movable along a guide means 2a, in the form of horizontal, elongated bars arranged at a level substantially above the stall. The support means 2 is connected to the guide means 2a, and a support suspension means 2b including a driving means, e.g. an electric or a pneumatic motor, which is adapted to move the support means 2 along the guide means 2a between a pair of stalls 6.

Figure 9:
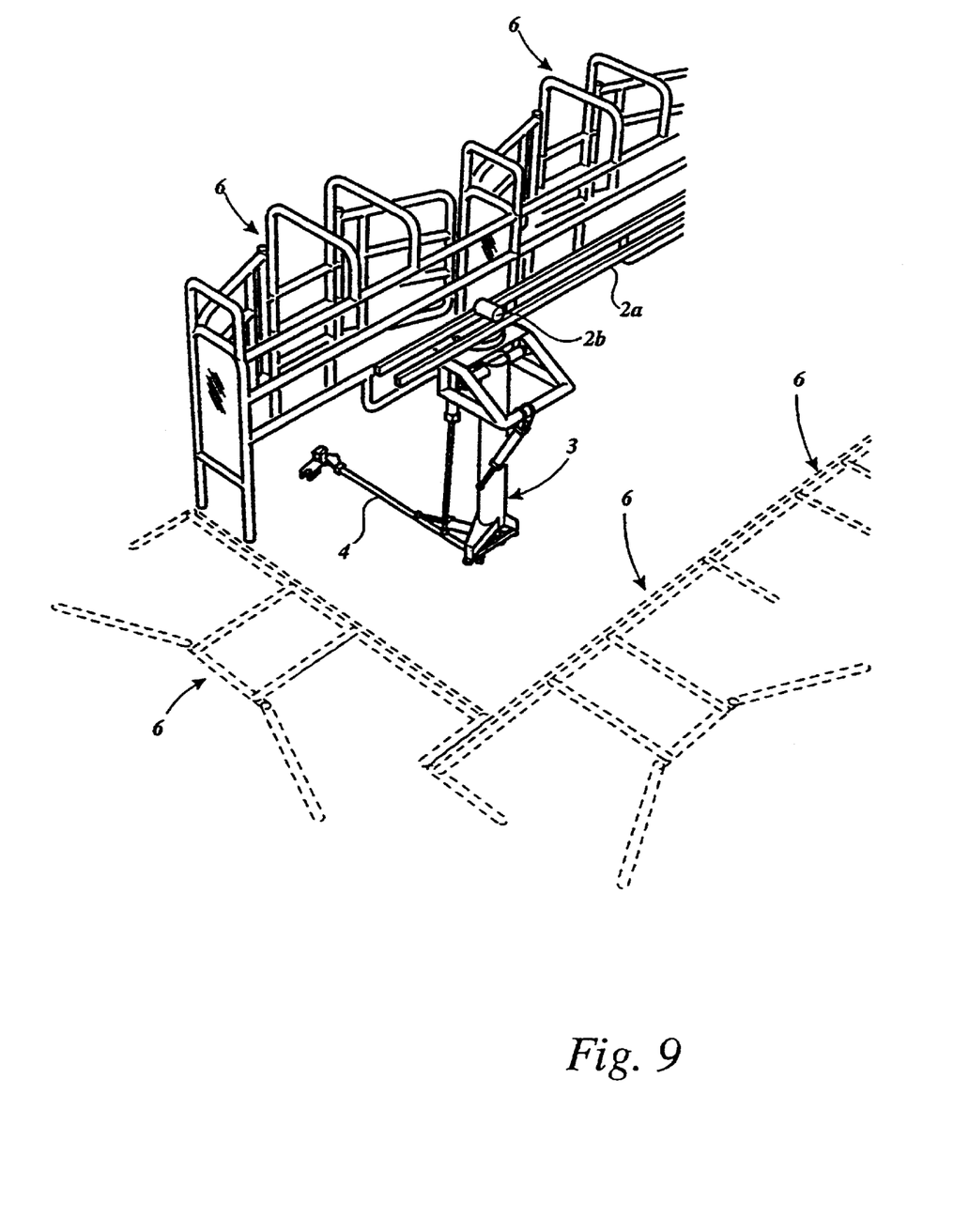
FIG. 9 is a perspective view of the apparatus shown in FIGS. 1 to 4, serving two rows of animal stalls.
Figure 10:
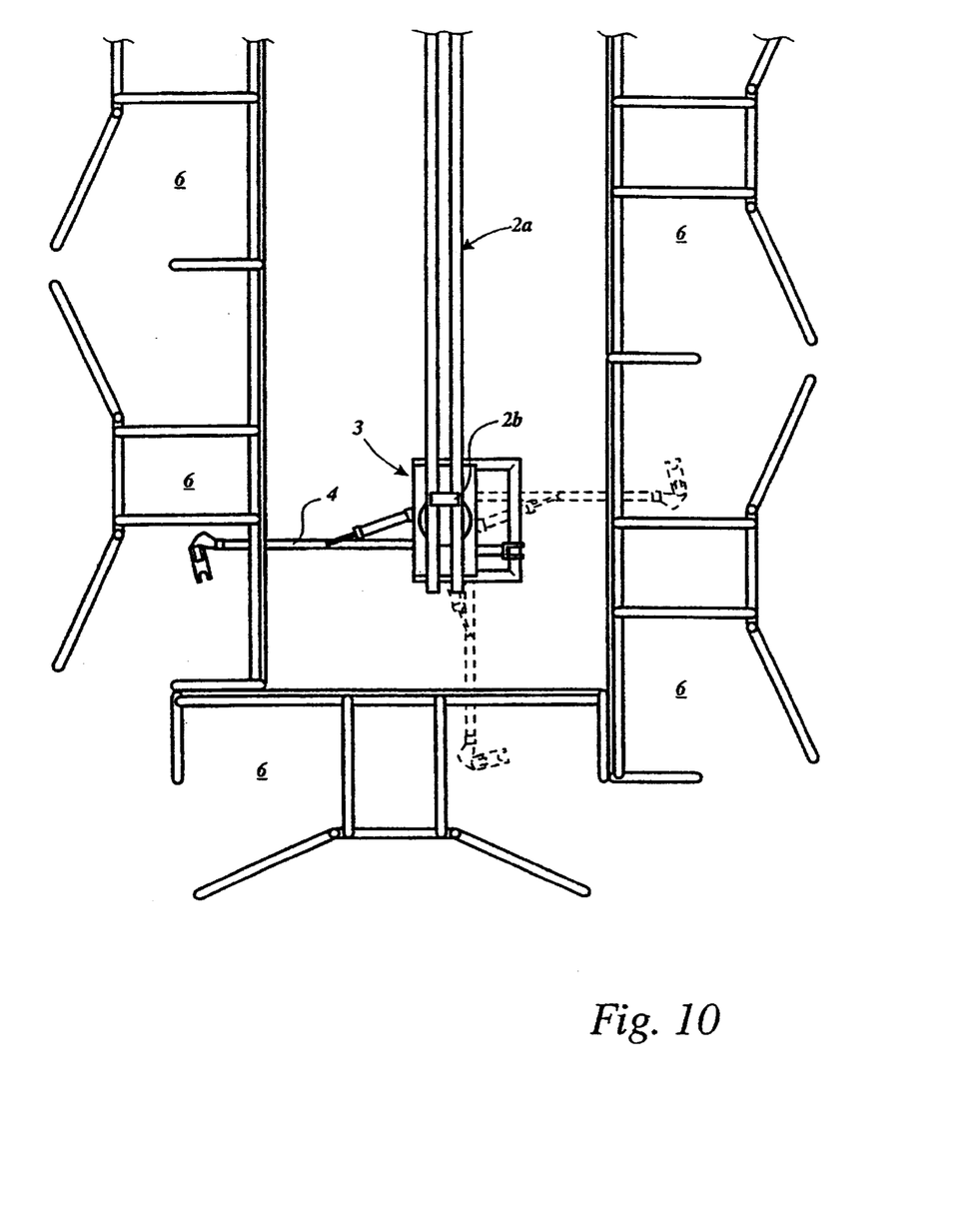
FIG. 10 is a top view of the apparatus illustrated in FIG. 9.

As shown in FIGS. 9 and 10, the support means 2 is provided with a support suspension means 2b, which is furthermore movable about a vertical axis by means of the driving means 2a. The robot arm 4 is thus able to serve not only stalls 6 that are arranged after one another in a row, but also two such rows arranged opposite to one another. Furthermore, the robot arm is able to serve stalls 6 that are arranged at an angle to the stalls in the respective row, e.g. perpendicular thereto, as shown in FIG. 9.

EP-A-0 635 203 discloses a milking robot, which can only be moved along a single row of milking stalls that are arranged side-by-side, and furthermore perpendicularly to the support means. For serving a second row of animal stalls, the support means must be extended to and along that second row.

EP-A-0 323 875 discloses a milking robot, which again is movable along a single is row of milling stalls, however are arranged after one another.

In EP-A-0 567 191 is described a pair of oppositely arranged stalls to be used at the borderline of two areas between which cows are to move between milkings, i.e., after being milked in one area, each cow enters the other area. The described robot arm is rotatable between the two adjacent stalls, but only after the entire herd has been milked in one area, in preparation for subsequent milking of the entire herd in the other area.

Returning to FIGS. 9 and 10, it is contemplated that instead of one perpendicular stall, there may instead be a number of stalls, e.g. three, that are arranged with another angle to one another, in that case 70°. Also two such angular stalls may be provided. Furthermore, it should be noted that more than three such stalls may be provided.

The animal stalls are arranged at a distance from one another, forming an elongated pace, in which the apparatus 1 is intended to be moved along.

Operation

An animal to be milked, such as a cow shown in FIGS. 2 and 6, will, if needed, be prepared for milking by a suitable teat cleaning apparatus. Subsequently, the robot arm 4 is moved to the right in FIGS. 2 and 6 by actuation of the driving means 8a such that the tubular member 12 or the frame 20 is moved as a pendulum about the hinges 7 to the right which in turn moves the robot arm 4 to the right. In order to keep the robot arm 4 in a horizontal position, if desired, the driving means 8b is actuated simultaneously as the driving means 8a is actuated, alternatively before or afterwards. In order to allow the robot arm 4 to perform a sideward movement, the driving means 8c is actuated.

When a teatcup 15 has been gripped by the manipulating means 16 and taken from the rack 14, the teatcup 15 is moved towards a teat of the cow teat locating means 18. When the teatcup has been placed underneath a selected teat, the teatcup 15 is raised and attached onto the teat, while a vacuum is produced inside the teatcup.

After milking, the teatcups will be returned by the robot arm 4 to the teatcup rack 14, or by a teatcup retracting means in the form of a rope or the like (not shown), and the cow will be let out from the milking stall.

Another cow will be let into the stall and the above operation will be performed for that cow. This will be repeated as long as there are cows that need to be milked. Alternatively, the robot arm will be moved to the next stall.

The invention is not limited to the above described details of the embodiments. Accordingly, even though the driving means 8a, 8b and 8c have been illustrated and described as pneumatic cylinders, it is apparent that hydraulic cylinders, electric motors or the like are possible to be used, solely or in combination with one another or with the pneumatic cylinders.

The motor 2b may be one or several pneumatic and or hydraulic cylinders and or electric motors.

Furthermore, the support means 2 is adaptable to the selected form of the frame. For example, as can be seen in FIG. 5 the first driving means 8a is located on the same side of the suspension means 3 as the second driving means 8b, whereas in FIG. 1, the first and second driving means 8a, 8b, are located on opposite sides of the suspension means. However, the support means 2 shown in FIG. 1 may be changed such that the first and second driving means 8a, 8b are located on the same side of the suspension means 3, and consequently the support means 2 shown in FIG. 4 may be changed such that the first and second driving means 8a, 8b, are located on opposite sides of the suspension means.

Furthermore, the above described different control means may of course be integrated into one, single control means.

Referring to FIGS. 5 and 8, the suspension means 3 may be connected directly to the guide means 2a, in which case the guide means 2a constitutes said support means 2, said motor 2b being associated with said suspension means.

In FIGS. 4 and 8, only a pair of stalls are shown. It should, however, be understood that more than two stalls may be provided, in which case the guide means is extended to run along all of, or a part of, the thus provided milking stalls, the milking robot will then, of course, serve each of the stalls along which the guide means 2a runs.

The guide means 2a has been shown as a pair of guide members, but it should be understood that the number of guide members may be only one. Furthermore, the number of guide members may be higher, i.e. three or more. The connection of the support means 2, or the suspension means 3, to the guide means 2a then of course needs adaptation to the number and kind of guide members.

Wherever a cow has been mentioned above, it should be understood that the apparatus according to the invention may also be used for milking any other milking animal, such as a sheep, a goat, a buffalo or a horse.

What is claimed is:

1. An apparatus for performing an animal related operation, comprising a support means and a robot arm connected to a robot arm suspension means, characterised in that said robot arm suspension means is hingedly connected to said support means about a single horizontal axis at an upper end of said robot arm suspension means, said horizontal axis being fixed in relation to said support means, said robot arm being arranged lower than said support means, for allowing said robot arm suspension means to perform a substantially pendulum movement about said horizontal axis, and a first driving means is directly connected to said support means and said robot arm suspension means for actively performing said movement.

2. An apparatus according to claim 1, wherein a first driving means is connected between said support means and said robot arm suspension means for actively performing said pendulum movement.

3. An apparatus according to claim 1, wherein said robot arm is pivotally connected to said robot arm suspension means, for allowing said robot arm to perform a pivotal movement in relation to said robot arm suspension means.

4. An apparatus according to claim 3, wherein a second driving means is connected between said support means and said robot arm, for actively moving said robot arm in a substantially upward/downward direction; and wherein a third driving means is connected between said robot arm and said robot arm suspension means for actively moving said robot arm in a substantially sideward direction.

5. An apparatus according to claim 4, wherein said robot arm suspension means comprises a pivot means having a bar movable about a substantially horizontal axis (A—A), said bar being provided with a first connection member for said robot arm and a second connection member for said third driving means, each of said first and second connection members being provided with a hinge movable about a substantially vertical axis.

6. An apparatus according to claim 1, wherein said robot arm support means comprises an elongated tubular member.

7. An apparatus according to claim 1, wherein said robot arm support means comprises an elongated frame of bars.

8. An apparatus according to claim 1, wherein said robot arm comprises a manipulating means for performing said operation.

9. An apparatus according to claim 1, wherein said robot arm is movable into an animal space, at least one side of which being provided with a railing.

10. An apparatus according to claim 9, wherein at least two animal spaces are provided, said support means being movable therebetween.

11. An apparatus according to claim 1, wherein the connection between the robot arm suspension means and the support means is arranged at a level substantially above said animal.

12. An apparatus according to claim 1, wherein said robot arm suspension means is adapted to be transported along a substantially horizontal path between said plurality of animal stalls for allowing said robot arm to perform at least one animal related operation in a plurality of animal stalls said robot arm being adapted to be rotated about a substantially vertical axis in relation to said robot arm suspension means, said robot arm further being movable at least into a pair of animal stalls arranged after one another, as seen in a longitudinal direction of said animal stall.

13. An apparatus according to claim 1, wherein said support means is arranged such that an accessible floor space is provided under said robot arm suspension means.

14. An apparatus according to claim 12, wherein two opposite animal stalls are arranged at a distance from one another, said distance forming a space between said animal stalls, said robot arm suspension means being arranged substantially in said space.

15. An apparatus according to claim 12, wherein at least two of said adjacent animal stalls are arranged at an angle to one another.

16. An apparatus according to claim 12, wherein an animal stall arranged substantially perpendicularly to the two opposite animal stalls is arranged overlapping thereto, said support means being arranged off-set to the perpendicularly arranged animal stall.

17. An apparatus according to claim 12, wherein said robot arm suspension means comprises a driving means for actively performing said rotation.

18. An apparatus according to claim 12, wherein said robot arm is movable in relation to said robot arm suspension means by means of at least one pneumatic cylinder.

19. An apparatus according to claim 1, wherein said robot arm is elongated and extends substantially horizontally and furthermore substantially across said horizontal axis.

20. An apparatus according to claim 19, wherein:

a first driving means is connected between said support means and said robot arm suspension means for actively performing said pendulum movement;

said robot arm is pivotally connected to said robot arm suspension means, for allowing said robot arm to perform a pivotal movement in relation to said robot arm suspension means;

a second driving means is connected between said support means and said robot arm, for actively moving said robot arm in a substantially upward/downward direction; and wherein a third driving means is connected between said robot arm and said robot arm suspension means for actively moving said robot arm in a substantially sideward direction;

said robot arm suspension means comprises a pivot means having a bar movable about a substantially horizontal axis, said bar being provided with a first connection member for said robot arm and a second connection member for said third driving means, each of said first and second connection members being provided with a hinge movable about a substantially vertical axis;

said robot arm support means comprises an elongated tubular member or an elongated frame of bars;

said robot arm comprises a manipulating means, for performing said operations;

said robot arm is movable between two animal spaces, at least one side of which being provided with a railing;

the connection between the robot arm suspension means and the support means is arranged at a level substantially above said animal;

said robot arm suspension means is adapted to be transported along a substantially horizontal path between said plurality of animal stalls for allowing said robot arm to perform at least one animal related operation in a plurality of animal stalls, said robot arm being adapted to be rotated about a substantially vertical axis in relation to said robot arm suspension means, said robot arm further being movable at least into a pair of animal stalls arranged after one another, as seen in a longitudinal direction of said animal stall;

two opposite animal stalls are arranged at a distance from one another, said distance forming a space between said animal stalls, said robot arm suspension means being arranged substantially in said space;

at least two of said adjacent animal stalls are arranged at an angle to one another;

an animal stall arranged substantially perpendicularly to the two opposite animal stalls is arranged overlapping thereto, said support means being arranged off-set to the perpendicularly arranged animal stall;

said support means comprises an elongated guide means arranged substantially above said robot arm suspension means, said elongated guide means being arranged along the side of two animal stalls arranged after one another;

said robot arm suspension means comprises a support suspension means connectible to said support means, for allowing said robot arm suspension means to be moved along said guide means;

said support suspension means comprises a driving means for performing the movement along said guide means;

said robot arm suspension means comprises a driving means for actively performing said rotation; and said robot arm is movable in relation to said robot arm suspension means by means of at least one pneumatic cylinder.

21. An apparatus according to claim 1, wherein said support means comprises an elongated guide means arranged substantially above said robot arm suspension means, said elongated guide means being arranged along the sides of two animal stalls arranged after one another.

22. An apparatus according to claim 21, wherein said robot arm suspension means comprises a support suspension means connectible to said support means, for allowing said robot arm suspension means to be moved along said guide means.

23. An apparatus according to claim 22, wherein said support suspension means comprises a driving means for performing the movement along said guide means.

* * * * *

UNITED STATES PATENT AND TRADEMARK OFFICE
CERTIFICATE OF CORRECTION

PATENT NO. : 6,386,141 B1
DATED : May 14, 2002
INVENTOR(S) : Gosta Forsen et al.

It is certified that error appears in the above-identified patent and that said Letters Patent is hereby corrected as shown below:

Column 3,
Line 50, "tabular" should read -- tubular --;

Column 5,
Line 2, "single is row" should read -- single row --;
Line 19, "pace" should read -- space --.

Signed and Sealed this

Twenty-sixth Day of August, 2003

JAMES E. ROGAN
*Director of the United States Patent and Trademark Office*